(12) United States Patent
Tobita et al.

(10) Patent No.: US 6,782,419 B2
(45) Date of Patent: Aug. 24, 2004

(54) SYSTEM AND METHOD FOR DISTRIBUTING IMAGES TO MOBILE PHONES

(75) Inventors: Naomi Tobita, Tokyo (JP); Fujio Ishii, Tokyo (JP)

(73) Assignee: Bandai Co., Ltd., Tokyo (JP)

( * ) Notice: Subject to any disclaimer, the term of this patent is extended or adjusted under 35 U.S.C. 154(b) by 685 days.

(21) Appl. No.: 09/771,638

(22) Filed: Jan. 30, 2001

(65) Prior Publication Data

US 2002/0009987 A1 Jan. 24, 2002

(30) Foreign Application Priority Data

Jul. 24, 2000 (JP) ........................................ 2000-221998

(51) Int. Cl.[7] .............................................. G06F 13/00
(52) U.S. Cl. ...................... 709/219; 709/206; 709/225; 719/311; 719/313
(58) Field of Search ................................. 455/414, 426, 455/566, 410; 709/203, 206, 217, 219, 225, 250; 719/311, 313, 328, 329

(56) References Cited

U.S. PATENT DOCUMENTS 6,038,295 A * 3/2000 Mattes ..................... 379/93.25
6,522,889 B1 * 2/2003 Aarnio ..................... 455/456.5
6,628,971 B1 * 9/2003 Yoon et al. ................. 455/566
6,636,748 B2 * 10/2003 Monroe ................... 348/14.02

* cited by examiner

Primary Examiner—Viet D. Vu
(74) Attorney, Agent, or Firm—Sughrue Mion, PLLC

(57) ABSTRACT

In the storage of images to be disclosed, records corresponding to the number of persons authorized in disclosure are added to the database 15. The mail addresses of image destinations are respectively described to the mail address fields of the added records. Image storage destinations are respectively described to the storage destination addresses. An electronic mail that notifies an image destination of an image in storage is created. A storage destination is set to the created electronic mail. Then, the electronic mail is transmitted. When an image disclosure request is received from a mobile phone, the record in which the storage destination of a disclosure required image is described is retrieved. The user identifier described in the user identifier field of the retrieved record is verified against the user identifier of the disclosure requesting mobile phone. When two user identifiers coincides with each other, the image is read out from the storage destination and then is transmitted and disclosed to the mobile phone. When two user identifiers do not coincide with each other, non-permission in disclosure is sent to the mobile phone.

29 Claims, 13 Drawing Sheets

| MAIL ADDRESS FIELD | STORAGE DESTINATION ADDRESS FIELD | USER IDENTIFIER FIELD |
|---|---|---|
| tru@xxx.ne.jp | adv ¥ddd | flsjglggj |
|  |  |  |
|  |  |  |

| MAIL ADDRESS FIELD | STORAGE DESTINATION ADDRESS FIELD | USER IDENTIFIER FIELD |  |
|---|---|---|---|
| tru@mail.ne.jp | abc ¥ ssss | hgfryuiii |  |
| a1@mail.ne.jp | avc ¥ aaaa |  | ~ 31 |
| a2@mail.ne.jp | avc ¥ aaaa |  | ~ 32 |
| a3@mail.ne.jp | avc ¥ aaaa |  | ~ 33 |
| a4@mail.ne.jp | avc ¥ aaaa |  | ~ 34 |
| a5@mail.ne.jp | avc ¥ aaaa |  | ~ 35 |

DATA

TRANSMITTER/
RECEIVER 51 ↔ REPEATER 52 ↔ HD  53

USER ID LIST TABLE 60

| INTRINSIC IDENTIFIER | TELEPHONE NUMBER | USER ID |
|---|---|---|
| xxxxxxx | 090 - xxxx - yyyyy | abcdefgh |
| yyyyyyy | 090 - yyyy - xxxxx | ksfhksfh |
| ......... | ......... | ......... |
| zzzzzzz | 090 - xxxx - zzzzz | lggeoivn |

FIG. 16

| MAIL ADDRESS FIELD | STORAGE DESTINATION ADDRESS FIELD | USER IDENTIFIER FIELD |
|---|---|---|
| tru@mail.ne.jp | abc¥ssss | hgfryuiii |
| a1@mail.ne.jp | avc¥aaaa | abcdefgh |
| a2@mail.ne.jp | avc¥aaaa | xtyruioo |
| a3@mail.ne.jp | avc¥aaaa | |
| a4@mail.ne.jp | avc¥aaaa | |
| a5@mail.ne.jp | avc¥aaaa | |

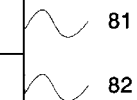

FIG. 17

| MAIL ADDRESS FIELD | STORAGE DESTINATION ADDRESS FIELD | USER IDENTIFIER FIELD |
|---|---|---|
| tru@mail.ne.jp | abc¥ssss | hgfryuiii |
| a1@mail.ne.jp | avc¥aaaa | abcdefgh |
| a2@mail.ne.jp | avc¥aaaa | xtyruioo |
| a3@mail.ne.jp | avc¥aaaa | jdvdvdvv |
| a4@mail.ne.jp | avc¥aaaa | dvdgrhgr |
| a5@mail.ne.jp | avc¥aaaa | ffgghegh |

SYSTEM AND METHOD FOR DISTRIBUTING IMAGES TO MOBILE PHONES

BACKGROUND OF THE INVENTION

1. Field of the Invention

The present invention relates to a system and method for disclosing images. Particularly, the present invention relates to a system and method capable of preventing images from being disclosed to persons more than a predetermined number of persons that is preliminary allowed to disclose such images, thereby, protecting copyright.

2. Description of Related Art

Like the recent service typically represented by i-mode, (by NTT Docomo), not only the mere communication service to conventional subscriber telephones but also a distribution service of contents to mobile phones from a contents server are being vigorously offered to mobile phones.

Of these services, there is the service of disclosing, for example, characters and images of illustrations to specific persons only. HTML mails are listed as a typical example. The HTML mail can disclose not only documents but also images matched with seasons or illustrations such as favorite comic-book characters together with a message, to only specific persons and is popular because of its high taste-oriented property.

However, in the conventional services, whether or not a person requesting the disclosure of an image is the same as a specific person authorized to view images cannot be assured at the time of image disclosure. If the identification information (storage location) on an image to be disclosed become available, persons other than specific authorized persons may obtain the image based on the identification information. That is, if the number of persons authorized in image disclosure is limited to five, persons more than five may illegally obtain images, since illustration contained in such image ought to be copyrighted.

SUMMARY OF THE INVENTION

The present invention is made to overcome the above-mentioned problems.

An objective of the present invention is to provide an image disclosure system capable of preventing images created using copyrighted illustrations from being disclosed to persons more than the limited number of persons authorized in image disclosure.

Another objective of the present invention is to provide an image disclosure method capable of preventing images created using copyrighted illustrations from being disclosed to persons more than the limited number of persons authorized in image disclosure.

In order to achieve the objectives, the present invention provides an image disclosure system, wherein an image displayed in a predetermined programming language by a user is disclosed to a specific person. The image disclosure system comprises a mobile communication network; a plurality of mobile phones connected to the mobile communication network; a gateway server connected to the plurality of mobile phones via the mobile communication network; a network; and a contents server connected to the gateway server via the network.

Each of the plurality of mobile phones includes a display for displaying images; means for transmitting an image disclosure to the contents server, the image disclosure request to which identification information on a disclosure requested image is added, and then downloading the image; and an image controller for displaying the downloaded image to the display.

The gateway server includes a user identifier table in which an intrinsic identifier and a user identifier paired with the intrinsic identifier is described in a one-to-one correspondence; and means for receiving an image disclosure request from a mobile phone, retrieving a user identifier corresponding to the intrinsic identifier of the mobile phone from the user identifier table; converting the intrinsic identifier of the mobile phone into a retrieved user identifier, and transmitting the image disclosure request from the mobile phone to the contents server.

The contents server includes a memory for storing an image to be disclosed; a database including records each being formed of an identification information field in which identification information for identifying an image to be disclosed is described and a user identifier field in which a user identifier is described; means for creating identification information on an image to be disclosed; data base updating means for adding records corresponding to the number of persons authorized in disclosure to the database and describing image identification information to the identification information field of each of the added records; retrieving means for, when a mobile phone sends an image disclosure request, retrieving a record which has an identification information field in which image identification information added to a disclosure request is described; and a disclosure controller.

The disclosure controller, when the user identifier of the disclosure requesting mobile phone coincides with a user identifier described on the identifier field of any one of the retrieved records, reads out a disclosure requested image out of the memory and then transmitting it to the mobile phone.

Moreover, the disclosure controller, when the user identifier of the disclosure requesting mobile phone does not coincide with user identifiers described on the identifier fields of the retrieved records and when there is a record of which a user identifier is not described on an identifier field, among the retrieved records, describes the user identifier of the disclosure requesting mobile phone in the identifier field of any one of records in which no user identifier is described and then reads out a disclosure requested image from the memory and then transmits it to the mobile phone.

Moreover, the disclosure controller, when the user identifier of the disclosure requesting mobile phone does not coincide with the user identifiers described in the identifier fields of the retrieved records and when an user identifier is described in all the identifiers of the retrieved records, inhibits image disclosure, without transmitting a disclosure requested image.

In the image disclosure system, the contents server comprises means for acquiring information on a specific person authorized in image disclosure from a mobile phone of a disclosure requesting person; and means for transmitting identification information on an image to be disclosed to a mobile phone of the specific person, based on the information on the specific person acquired.

In the image disclosure system, a member record in which the user identifier of a mobile phone of a service member is described in a user identifier field is previously stored in the database. The system further comprises database updating means for, when a specific person authorized in image disclosure is a service member, describing identification information on an image to be disclosed in the identification information field of a member record of the service member.

In the image disclosure system, information on a storage destination storing an image is used as image identification information.

An another aspect of the present invention provides an image disclosure system wherein an image displayed in a predetermined programming language by a user is disclosed to a specific person. The image disclosure system comprises a mobile communication network; a plurality of mobile phones connected to the mobile communication network; a gateway server connected to the plurality of mobile phones via the mobile communication network; a network; a contents server connected to the gateway server via the network; and a mail server for transmitting an electronic mail to the mobile phone.

Each of the plurality of mobile phones includes a display for displaying images; an electronic mail receiver for receiving an electronic mail to which image identification information is added; means for transmitting an image disclosure request to the contents server, the image disclosure request to which the image identification information is added, and then downloading an image; and an image controller for displaying the downloaded image to the display.

The gateway server includes a user identifier table in which an intrinsic identifier of a mobile phone and a user identifier paired with the intrinsic identifier are described in a one-to-one correspondence; and means for receiving an image disclosure request from a mobile phone, retrieving a user identifier corresponding to the intrinsic identifier of the mobile phone from the user identifier table, converting the intrinsic identifier of the mobile phone into a retrieved user identifier, and transmitting the image disclosure request from the mobile phone to the contents server.

The contents server includes a memory for storing an image to be disclosed; a database including records each being formed of an identification information field in which identification information for identifying an image to be disclosed is described and a user identifier field in which a user identifier is described; means for creating identification information on an image to be disclosed; means for transmitting an electronic mail to which identification information on the created image is added, to a specific person authorized in image disclosure; data base updating means for adding records corresponding to the number of persons authorized in image disclosure to the database and describing the identification information of the image to the identification information field of each of the records added, retrieving means for, when a mobile phone sends an image disclosure request, retrieving a record in which image identification information added to a disclosure request is described in the identification information field; and a disclosure controller.

The disclosure controller, when the user identifier of the disclosure requiring mobile phone coincides with a user identifier described on the identifier field of any one of the retrieved records, reads out an image specified with the image identification information from the memory and then transmits it to the mobile phone.

Moreover, the disclosure controller, when the user identifier of the disclosure requiring mobile phone does not coincide with a user identifier described on the identifier fields of the retrieved records and when there are records in which user identifiers are not described in an identifier field, among the retrieved records, describes the user identifier of the disclosure requesting mobile phone in the identifier field of any one of records in which user identifiers are not described and then reads out an image specified with the image identification information from the memory and then transmits it to the mobile phone.

Moreover, the disclosure controller, when the user identifier of the disclosure requesting mobile phone does not coincide with user identifiers described in the identifier fields of the retrieved records and when the user identifier is described in all the identifiers of the retrieved records, inhibits image disclosure, without transmitting a disclosure requested image.

In the image disclosure system, each of the mobile phones comprises means for creating an image to be disclosed and means for transmitting the created image and information on specific persons authorized in disclosure of the created image, to the contents server; and the contents server comprises means for receiving the created image and storing it into the memory and means for notifying the database updating means of the number of persons authorized in disclosure based on information on the specific person.

In the image disclosure system, the database stores a member record in which the user identifier of a mobile phone of a service member is described in a user identifier field. The database updating means, when a specific person authorized in image disclosure is a service member, describes identification information on an image to be disclosed in the identification information field of the member record of the service member.

In the image disclosure system, information on a storage destination storing an image is used as image identification information.

In the image disclosure system, the contents server comprises an image data memory for storing image data used to create an image to be disclosed and means for reading out a desired image data from the image data memory, in response to an image creation request from a mobile phone and then transmitting it to the mobile phone. Each of the mobile phones comprises means for requesting image data to the contents server, acquiring image data, creating an image to be disclosed, with the acquired image data, and transmitting the created image and a mail address of a specific person being an image disclosure destination, to the contents server.

In the image disclosure system, the gateway server comprises a type information table in which an intrinsic identifier of a mobile phone and type information of the mobile phone are described in a one-to-one correspondence and means for retrieving the type information of the mobile phone from the type information table, in response to a request from the mobile phone, based on an intrinsic identifier added to the request, adding the type information to the request, and then transmitting the added information. The contents server comprises image data memory for storing image data used for image creation for every type of mobile phones and means for reading out image data corresponding to the type information added to the request from the image data memory and then transmitting it to the mobile phone.

In further another aspect, the present invention provides an contents server in an image disclosure system. The contents server discloses an image displayed in a predetermined programming language by a user, to a specific person. The image disclose system includes a mobile communication network, a plurality of mobile phones connected to the mobile communication network, a gateway server connected to the plurality of mobile phones via the mobile communication network, a network, and a contents server connected to the gateway server via the network. The gateway server, when the mobile phone transmits a request to the contents server, convert an intrinsic identifier of a mobile phone added to the request into a user identifier corresponding to the intrinsic identifier and then transmits the request to the contents server.

The contents server comprises a memory for storing the image to be disclosed; a database including records each being formed of an identification information field in which identification information for identifying an image to be disclosed is described and a user identifier field in which a user identifier is described; means for creating identification information on an image to be disclosed; data base updating means for adding records corresponding to the number of persons authorized in image disclosure to the database and describing the image identification information in the identification information field of each of the records added; retrieving means for retrieving records in which identification information on an image added to a disclosure request is described in an identification information field, in response to an image disclosure request from a mobile phone; and a disclosure controller.

The disclosure controller, when the user identifier of the disclosure requesting mobile phone coincides with a user identifier described in the identifier field of any one of the retrieved records, reads out a disclosure requested image from the memory and then transmits it to the mobile phone.

The disclosure controller, when the user identifier of the disclosure requesting mobile does not coincide with a user identifier described in the identifier fields of the retrieved records and when there are records in which a user identifier is not described in an identifier field, among the retrieved records, describes the user identifier of the disclosure requesting mobile phone in the identifier field of any one of records in which user identifiers are not described.

The disclosure controller reads out a disclosure requested image from the memory, transmits it to the mobile phone, and then, when the user identifier of the disclosure requesting mobile phone does not coincide with the user identifiers described in the identifier fields of the retrieved records and when a user identifier is described in all the identifier fields of all of the retrieved records, inhibits image disclosure, without transmitting a disclosure requested image.

The contents server further comprises means for acquiring an image to be disclosed and information on the number of persons authorized in image disclosure, from a mobile phone of a disclosure requesting person.

The contents server further comprising means for acquiring information on a person authorized in image disclosure from a mobile phone of a disclosure requiring person and means for transmitting the identification information on an image to be disclosed to the mobile phone of the specific person, based on information on the acquired specific person.

In the contents server, the database stores a member record in which a user identifier of a mobile phone of a service member is described in a user identifier field. The contents server further comprises database updating means for, when a specific person authorized in image disclosure is a service member, describing identification information on an image to be disclosed in the identification information field of a member record of the service member.

In the image disclosure system, information on a storage destination storing an image is used as image identification information.

In another aspect, the present invention provides an image disclosure method, where in an image displayed in a predetermined programming languages by a user is disclosed to a specific person in an network system. The network system includes a mobile communication network; a plurality of mobile phones connected to the mobile communication network; a gateway server connected to the plurality of mobile phones via the mobile communication network; a network; a contents server connected to the gateway server via the network, and a mail server for transmitting an electronic mail to the mobile phones.

The image disclosure method comprises the steps of creating image identification information for identifying an image to be disclosed, by means of the contents server; adding, by means of the contents server, records corresponding to the number of persons authorized in image disclosure to a database and then describing the image identification information in the identification information field of each of the added records, the data base including records each being formed of an identification information field in which the image identification information is described and a user identification field in which a user identifier is described; transmitting an image disclosure request to which image identification information on a disclosure required image is added, to the contents server by means of the mobile phone; converting, by means of the gateway server, the intrinsic identifier of the mobile phone added to an image disclosure request and then transmitting the image disclosure request to the contents server; receiving, by means of the contents server, an image disclosure request from the mobile phone and then retrieving a record in which image identification information added to the disclosure request is described in an identification information field; transmitting, when the user identifier of the disclosure requesting mobile phone coincides with a user identifier described in the identifier field of any one of the retrieved records, a disclosure required image to the mobile phones by means of the contents server; describing, when the user identifier of the disclosure requesting mobile phone does not coincide with a user identifier described in the identifier fields of the retrieved records and when there are records in which a user identifier is not described in an identifier field, among the retrieved records, the user identifier of the disclosure requesting mobile phone in the identifier field of any one of records in which user identifiers are not described and then transmitting a disclosure required image to the mobile phone; and inhibiting, when the user identifier of said disclosure requesting mobile phone does not coincide with the user identifier described in the identifier fields of the retrieved records and when an user identifier is described on the identifiers of all of the retrieved records, image disclosure by means of the contents server, without transmitting a disclosure requested image.

The image disclosure method further comprises the step of acquiring an image to be disclosed and information on the number of persons authorized in image disclosure from a mobile phone of a disclosure requesting person.

The image disclosure method further comprises the steps of acquiring information on a specific person authorized in image disclosure from a personal phone of a disclosure requesting person; and transmitting image identification information on an image to be disclosed to a mobile phone of the specific person, based on the information on the acquired specific person.

The image disclosure method further comprises the steps of information on a storage destination storing an image to be disclosed is used as image identification information.

The image disclosure method further comprises the steps of previously storing to the database a member record in which the user identifier of a mobile phone of a service member is described in a user identifier field; and describing, when a specific person authorized in image disclosure is a service member, image identification information on an image to be disclosed in the identification information field of the member record, without newly adding a record.

The present invention provide an image disclosure system wherein an image displayed in a predetermined programming language by a user is disclosed to a specific person, comprising: a mobile communication network; a plurality of mobile phones connected to said mobile communication network; a gateway server connected to said plurality of mobile phones via said mobile communication network; a network; and a contents server connected to said gateway server via said network; said plurality of mobile phones each including: a display for displaying images; a processor is configured to transmit an image disclosure to said contents server, said image disclosure request to which identification information on a disclosure requested image is added, and then downloading said image; and to display said downloaded image to said display; said gateway server including: a user identifier table in which an intrinsic identifier and a user identifier paired with said intrinsic identifier is described in a one-to-one correspondence; and a processor is configured to receive an image disclosure request from a mobile phone, retrieving a user identifier corresponding to the intrinsic identifier of said mobile phone from said user identifier table; convert said intrinsic identifier of said mobile phone into a retrieved user identifier, and transmit the image disclosure request from said mobile phone to said contents server; said contents server including: a memory for storing an image to be disclosed; a database including records each being formed of an identification information field in which identification information for identifying an image to be disclosed is described and a user identifier field in which a user identifier is described; a processor is configured to create identification information on an image to be disclosed; add records corresponding to the number of persons authorized in disclosure to said database and describe image identification information to the identification information field of each of said added records; retrieve a record which has an identification information field in which image identification information added to a disclosure request is described when a mobile phone sends an image disclosure request; when the user identifier of said disclosure requesting mobile phone coincides with a user identifier described on the identifier field of any one of said retrieved records, read out a disclosure requested image out of said memory and then transmitting it to said mobile phone; when the user identifier of the disclosure requesting mobile phone does not coincide with user identifiers described on the identifier fields of said retrieved records and when there is a record of which a user identifier is not described on an identifier field, among said retrieved records, describe the user identifier of said disclosure requesting mobile phone in the identifier field of any one of records in which no user identifier is described and then reading out a disclosure requested image from said memory and then transmitting it to said mobile phone; when the user identifier of said disclosure requesting mobile phone does not coincide with the user identifiers described in the identifier fields of said retrieved records and when an user identifier is described in all the identifiers of said retrieved records, reject image disclosure.

The processor of the contents server is further configured to: acquire information on a specific person authorized in image disclosure from a mobile phone of a disclosure requesting person; and transmit identification information on an image to be disclosed to a mobile phone of said specific person, based on said information on said specific person acquired.

In another aspect of the invention, a member record in which the user identifier of a mobile phone of a service member is described in a user identifier field is previously stored in said database; and the processor of the contents server is further configured to, when a specific person authorized in image disclosure is a service member, describe identification information on an image to be disclosed in the identification information field of a member record of said service member.

The information on a storage destination storing an image is used as image identification information.

The present invention provide an contents server in an image disclosure system, said contents server disclosing an image displayed in a predetermined programming language by a user, to a specific person, said image disclose system including a mobile communication network, a plurality of mobile phones connected to said mobile communication network, a gateway server connected to said plurality of mobile phones via said mobile communication network, a network, and a contents server connected to said gateway server via said network; said gateway server, when said mobile phone transmits a request to said contents server, converting an intrinsic identifier of a mobile phone added to said request into a user identifier corresponding to said intrinsic identifier and then transmitting said request to said contents server; said contents server comprises: a memory for storing said image to be disclosed; a database including records each being formed of an identification information field in which identification information for identifying an image to be disclosed is described and a user identifier field in which a user identifier is described; a processor is configured to create identification information on an image to be disclosed, add records corresponding to the number of persons authorized in image disclosure to said database and describing the image identification information in the identification information field of each of said records added, retrieve records in which identification information on an image added to a disclosure request is described in an identification information field, in response to an image disclosure request from a mobile phone, when the user identifier of the disclosure requesting mobile phone coincides with a user identifier described in the identifier field of any one of said retrieved records, read out a disclosure requested image from said memory and then transmitting it to said mobile phone, when the user identifier of the disclosure requesting mobile does not coincide with a user identifier described in the identifier fields of said retrieved records and when there are records in which a user identifier is not described in an identifier field, among said retrieved records, describe the user identifier of said disclosure requesting mobile phone in the identifier field of any one of records in which user identifiers are not described, and read out a disclosure requested image from said memory, transmitting it to said mobile phone, and then, when the user identifier of said disclosure requesting mobile phone does not coincide with the user identifiers described in the identifier fields of said retrieved records and when a user identifier is described in all the identifier fields of all of said retrieved records, inhibiting image disclosure, without transmitting a disclosure requested image.

The processor of the contents server is further configured to acquire an image to be disclosed and information on the number of persons authorized in image disclosure, from a mobile phone of a disclosure requesting person.

The processor of the contents server is further configured to acquire information on a person authorized in image disclosure from a mobile phone of a disclosure requiring person and means for transmitting the identification information on an image to be disclosed to the mobile phone of said specific person, based on information on said acquired specific person.

In another aspect of the invention, the database stores a member record in which a user identifier of a mobile phone of a service member is described in a user identifier field; and said processor of said contents server is further configured to, when a specific person authorized in image disclosure is a service member, describe identification information on an image to be disclosed in the identification information field of a member record of said service member.

The information on a storage destination storing an image is used as image identification information.

BRIEF DESCRIPTION OF THE DRAWINGS

This and other objects, features and advantages of the present invention will become more apparent upon a reading of the following detailed description and drawings, in which:

FIG. 16 is a diagram explaining the operation of a distribution process; and

FIG. 17 is a diagram illustrating the operation of a distribution process.

DESCRIPTION OF THE EMBODIMENTS

An image disclosure system according to embodiments of the present invention will be described below in detail.

In explanation in this embodiment, it is assumed that an HTML (Hyper Text Markup Language) is used as a predetermined programming language and that a document mail with illustrations displayed using the HTML (merely referred as to a HTML mail) is shown as an image. It is further assumed that illustrations used for an HTML mail are copyrighted and that a specific person to which an image is disclosed is a HTML mail destination.

A first embodiment of the present invention will be described here.

Figure 1:
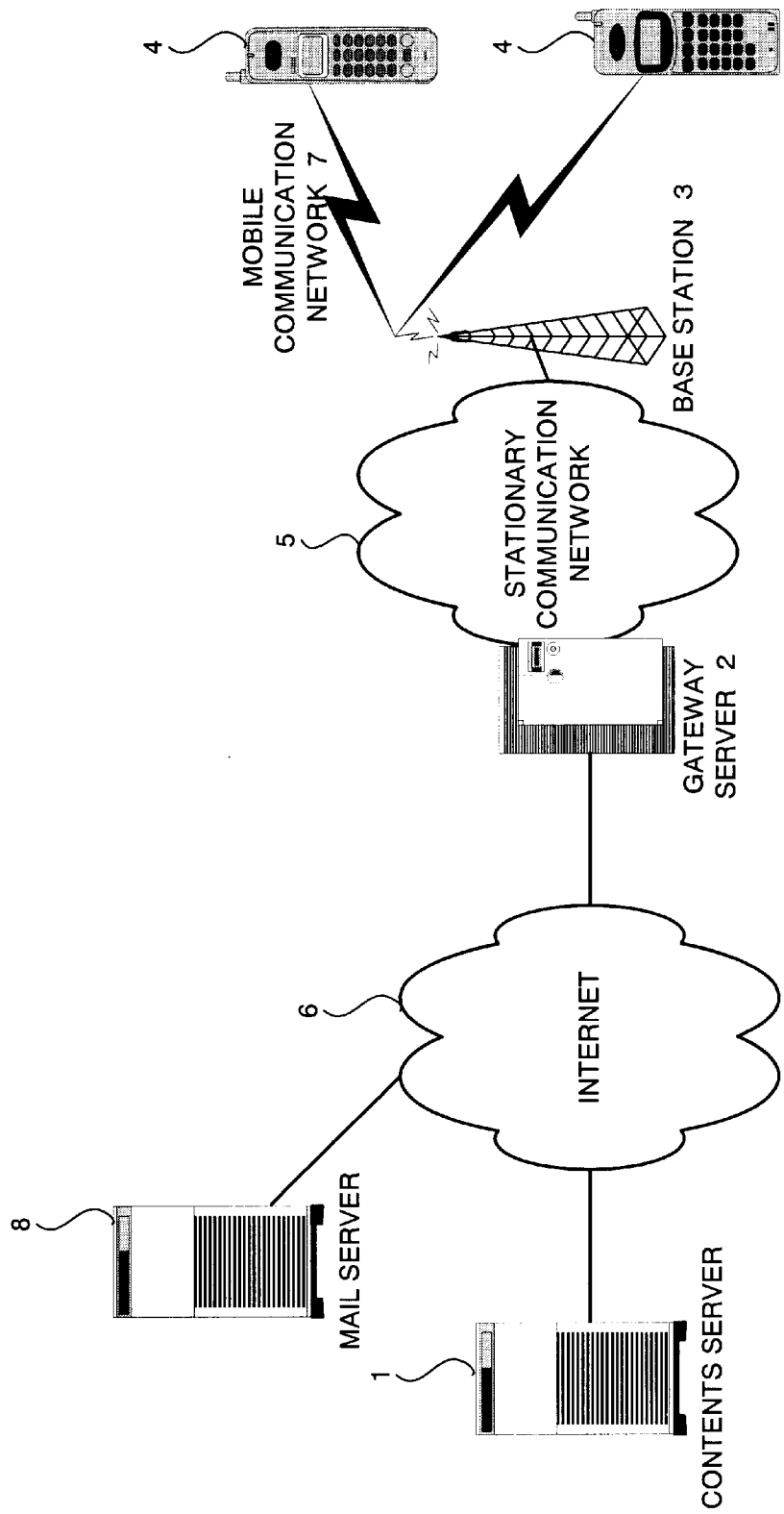
FIG. 1 is a block diagram of an image disclosure system according to a first embodiment of the present invention.

FIG. 1 is a block diagram of the first embodiment.

Referring to FIG. 1, an image disclosure system comprises a contents server 1 for transmitting contents, a gateway server 2, a base station 3, a mobile phone 4, a stationary communication network 5 on the side of the gateway server 2, a communication network 6 (internet) connecting the gateway server 2 and the contents server 1, a mobile communication network 7, and a mail server 8 for transmitting and receiving electronic mails.

In the constituent elements, the base station 3, the stationary communication network 5, the communication network (internet), the mobile communication network 7, and the mail server 8 are conventionally used and hence the duplicate explanation will be omitted here.

Figure 2:
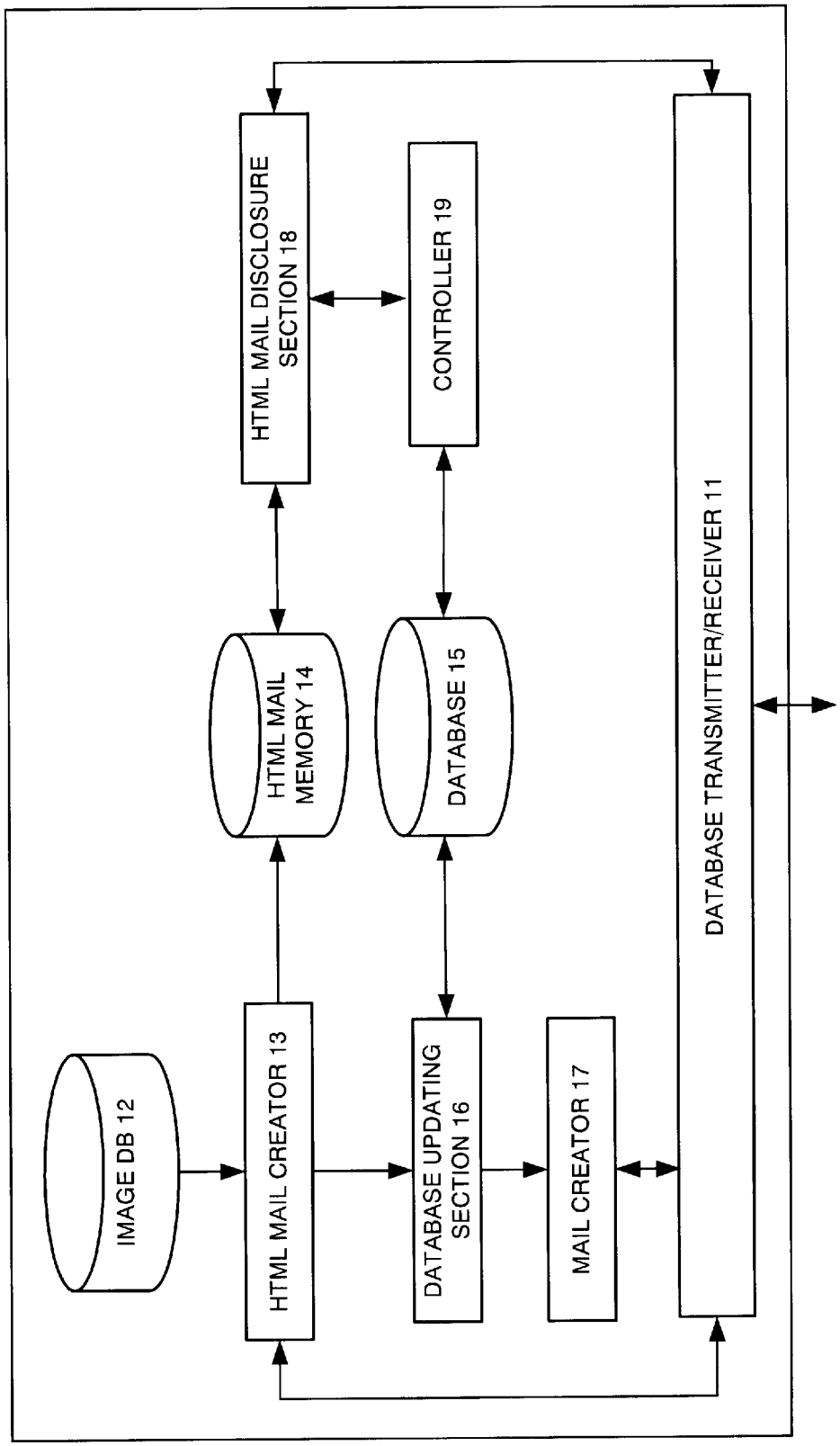
FIG. 2 is a block diagram of a contents server 1.

First, the contents server 1 will be explained here. FIG. 2 is a block diagram of the contents server 1.

Referring to FIG. 2, numeral 11 represents a transmitter/receiver that transmits and receives data.

Figure 3:
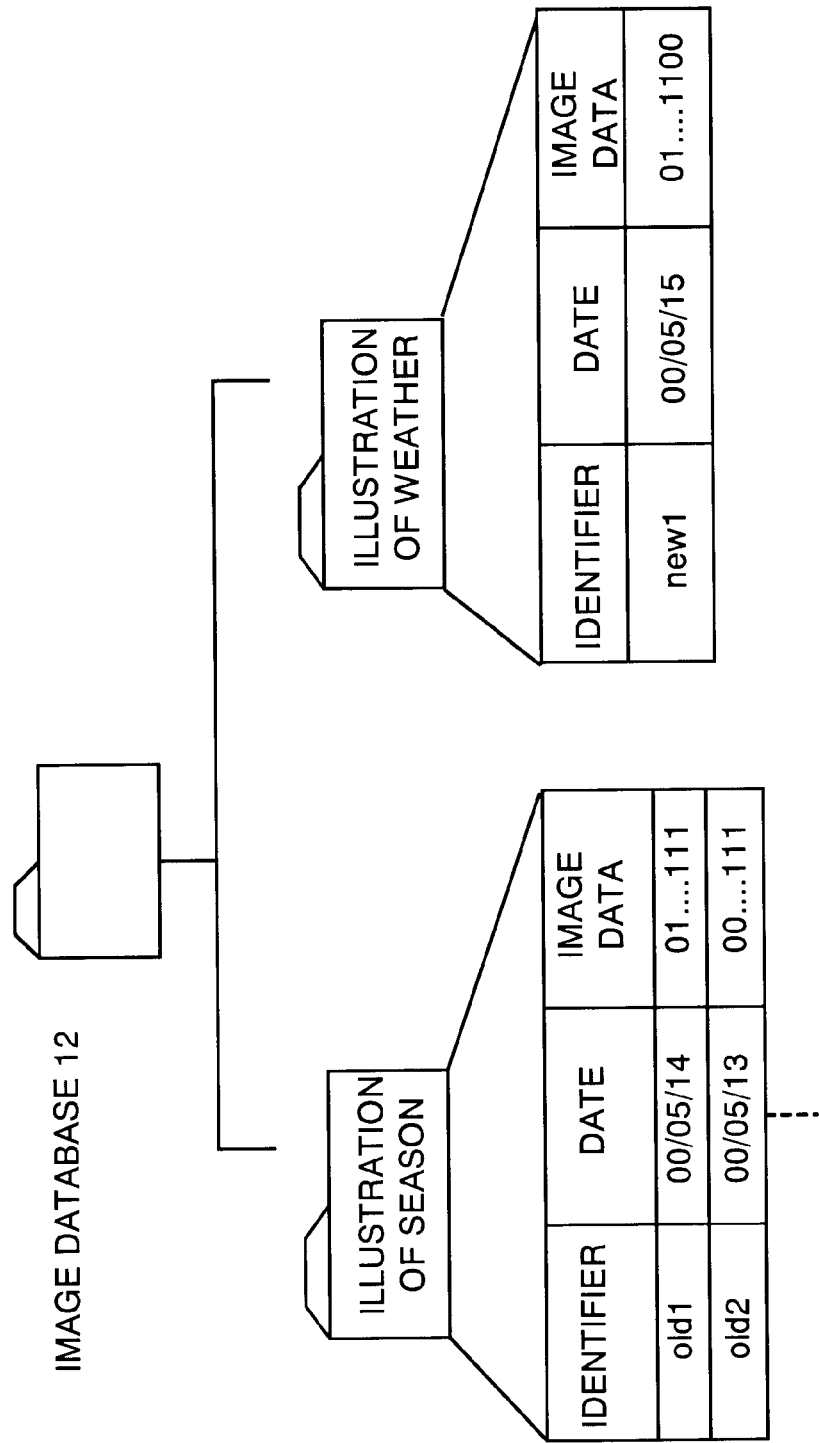
FIG. 3 is a diagram explaining an image database 12.

Numeral 12 represents an image database storing image data (illustrations) used for HTML mails. The image database 12, as shown in FIG. 3, includes folders organized by group having, for example, a group of illustrations for seasons and a group of illustrations for weather. Each of the folders stores image data for plural illustrations.

Numeral 13 represents an HTML mail creator that creates HTML mails. In response to a request, the HTML mail creator 13 transmits data necessary for creation of THML mails to the mobile phone 4. Thus, the HTML mail creator 1 adds a predetermined file name (identification information) to the created HTML mail and then stores it to the HTML mail memory 14 (to be described later).

Numeral 14 represents an HTML mail memory that stores the created HTML mail.

Numeral 15 represents a database used for an HTML mail disclosure process. In the database 15 shown in FIG. 4, a record is formed of a mail address field in which the mail address of an HTML mail destination (disclosure destination) is described, a storage destination address field in which the storage destination address of the HTML mail (image identification information) is described, and a user identifier field in which a user identifier field in which a user identifier (to be described later) is described.

Figures 4, 5:
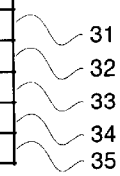
FIG. 4 is a diagram explaining a database 15.
FIG. 5 is a diagram explaining a database 15.

Numeral 16 represents a database updating section. The database updating section 16 receives the storage destination address (file name) of an HTML mail to be disclosed, the number of persons authorized in disclose- of the HTML mail (looking the HTML mail), and a mail address, transmitted from the HTML mail creator 13. The records corresponding to the number of persons authorized in disclosure of the HTML mail are added to the database 15. The storage destination address of the HTML mail is described in the storage field of each record. The mail addresses of persons authorized in disclosure are described in the mail address field of each record. Let us now assume that the identification information (storage destination address) of an image to be disclosed is "avc¥aaaa" and that the number of persons authorized in image disclosure is five and that the mail addresses of specific persons authorized in image disclosure are "a1@mail.ne.jp", "a2@mail.ne.jp", "a3@mail.ne.jp", "a4@mail.ne.jp", and "a5@mail.ne.jp", respectively. In such an example, the database updating section 16, as shown in FIG. 5, adds the records 31 to 35 for the five authorized persons to the database 15 and respectively describes "avc aaaa" to the storage destinations of records 31 to 35. Moreover, "a1@mail.ne.jp" is described in the mail address field of the record 31. "a2@mail.ne.jp" is described in the mail address field of the record 32. "a3@mail.ne.jp" is described in the mail address field of the record 33. "a4@mail.ne.jp" is described in the mail address field of the record 34. "a5@mail.ne.jp" is described in the mail address of the record 35.

Numeral 17 represents a mail creator. The mail creator 17 creates an electronic mail notifying the HTML mail destination (disclosure destination) of an HTML mail in storage. The HTML mail storage destination address is set as a link to the created electronic mail.

Numeral 18 represents an HTML mail disclosure section. When a mobile phone 4 sends an HTML mail disclosure request, the HTML disclosure section 18 transmits an HTML mail storage destination address and the user identification information of the disclosure requesting mobile phone 4 from the link information to the controller 19 (to be described later). The HTML mail disclosure 18 reads out an HTML mail from the storage destination under control instructions from the controller 19 and then transmits it to the disclosure requesting mobile phone 4. Otherwise, the HTML mail disclosure section 18 notifies the mobile phone 4 of no disclosure of an HTML mail.

Numeral 19 represents a controller. The controller 19 receives information from the HTML mail disclosure section 18 and retrieves the record of which the storage destination address of the HTML mail requested in disclosure is described to the storage destination field, from the database 15. When the user identifier of a disclosure requesting phone coincides with the user identifier described in the identifier field of any one of retrieved records, the controller 19 issues permission of disclosure to the HTML mail disclosure section 18. When the user identifier of the disclosure requesting mobile phone does not coincide with the user identifiers described in the identifier fields of retrieved records and when there is a record in which the user identifier is not described in the identifier field among retrieved records, the controller 19 describes the user identifier of the disclosure requesting mobile phone in the identifier of any one of the records in which no user identifier is described and then issues permission of disclosure to the HTML mail disclosure section 18. Moreover, when the user identifier of the disclosure requesting mobile phone does not coincide with the user identifiers described in the identifier fields of the retrieved records and when the user identifier is described in the identifier fields of all retrieved records, the controller 19 issues non-permission of disclosure to the HTML mail disclosure section 18.

In this invention, the database updating section 16 generates records corresponding to the number of specific persons authorized in disclosure of one HTML mail into the database 15. The user identifiers of disclosure requesting mobile phones are sequentially described in the records. When the user identifiers are described in all the records, disclosures to persons other than the authorized persons are rejected. Thus, the image is not disclosed greater than the number of records, that is, to persons other than the persons authorized in disclosure.

Usually, the above configuration works without any inconvenience because a person informed of an HTML mail in storage does not re-transmit the information to other persons before the person views the HTML mail.

If a user identifier described in a record is the same as the user identifier requesting disclosure, disclosure is allowed. Hence, even if the same person requests disclosure for the second time or later, the disclosure request can be allowed.

In this explanation, for convenience in notifying a disclosure destination of an electronic mail, the mail address field is provided to the database 5. However, since it is not essential to verify the mail address at the time of verification in disclosure, the mail address field may be omitted from the database 15.

The number of persons authorized in disclosure is calculated based on the number of mail addresses acquired via mobile phones. However, if the number of persons authorized in disclosure is previously determined, it is unnecessary to acquire the information on the number of persons via mobile phones.

Next, the gateway server 2 will be described below.

The gateway server 2 acts as a gateway to the contents server 1. The gateway server 2 has the function of transmitting information acquired via the mobile phone 4 to the contents server 1 in accordance with a request from the mobile phone 4.

Figures 6, 7:
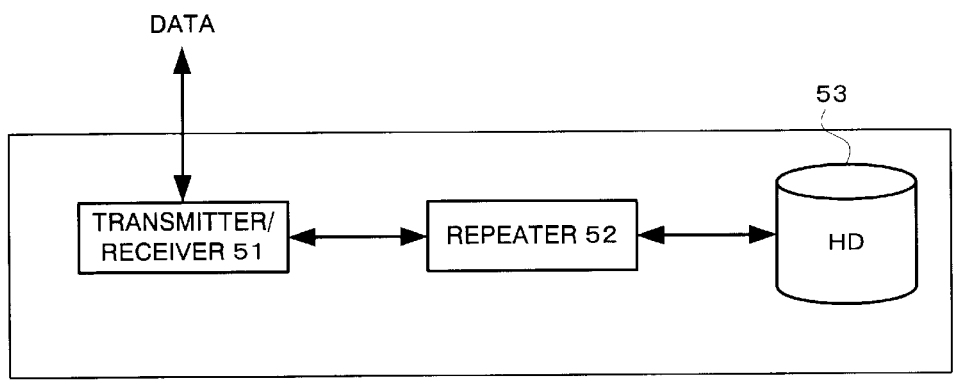
FIG. 6 is a block diagram of a gateway server 2.
FIG. 7 is a diagram explaining a user identifier list table 60.

FIG. 6 is a block diagram of a gateway server 2. Referring to FIG. 5, numeral 51 represents a transmitter/receiver that transmits and receives data. Numeral 52 represents a repeater that serves as an interface between the mobile phone 4 and the contents server 1. Numeral 53 represents a hard disk that stores a user identifier list table.

The hard disk 53 stores a user identifier list table 60. The user identified list table 60, as shown in FIG. 7, is a table describing the telephone number of a mobile phone 4, an intrinsic identifier for identifying the mobile phone 4 belonging to the telephone number, and a user identifier paired with the intrinsic identifier, in one-to-one correspondence.

In the web interface (HTML) executed via the gateway server 2, when receiving a request from the portable phone 4, the gateway server 2 converts the intrinsic identifier added to the request from the mobile phone 4 into a user interface corresponding to the intrinsic identifier, using the user identifier list table 60. Thus, the gateway server 2 transfers the request to the contents server 1. The i-mode server in i-mode service provided by NTT DoCoMo (trademark) is shown as a typical example of the web server 2.

Next, the mobile phone 4 is explained below.

Figure 8:
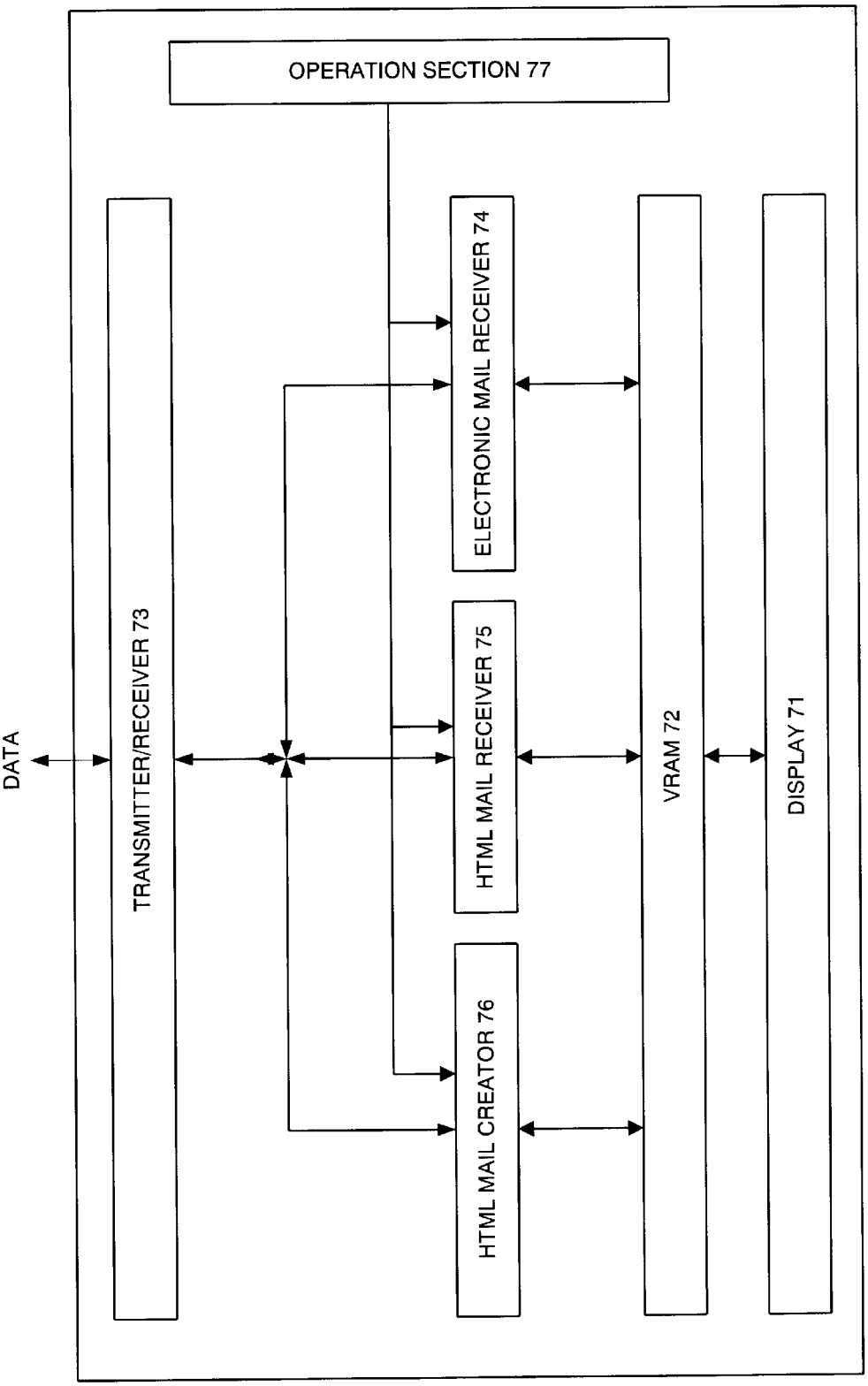
FIG. 8 is a block diagram of a mobile phone 4.

FIG. 8 is a block diagram of the mobile phone 4. Referring to FIG. 8, numeral 71 represents a display that displays images. Numeral 72 represents a VRAM (Video Random Access Memory) that displays images on the display 71. Numeral 73 represents a transmitter/receiver that transmits and receives data. Numeral 74 represents an electronic mail receiver that receives electronic mails. Numeral 75 represents an HTML mail receiver that is linked to the link destination of a received electronic mail and downloads an HTML mail. Numeral 76 represents an HTML mail creator that creates HTML mails. Numeral 77 represents an operation section such as a ten-keyboard.

When a request is transmitted to the contents server 1, the mobile phone 4 adds an intrinsic identifier for identification to the request and then transmits the added data.

The creation of a HTML mail will be explained by referring to FIG. 9 and FIG. 10.

Figure 9:
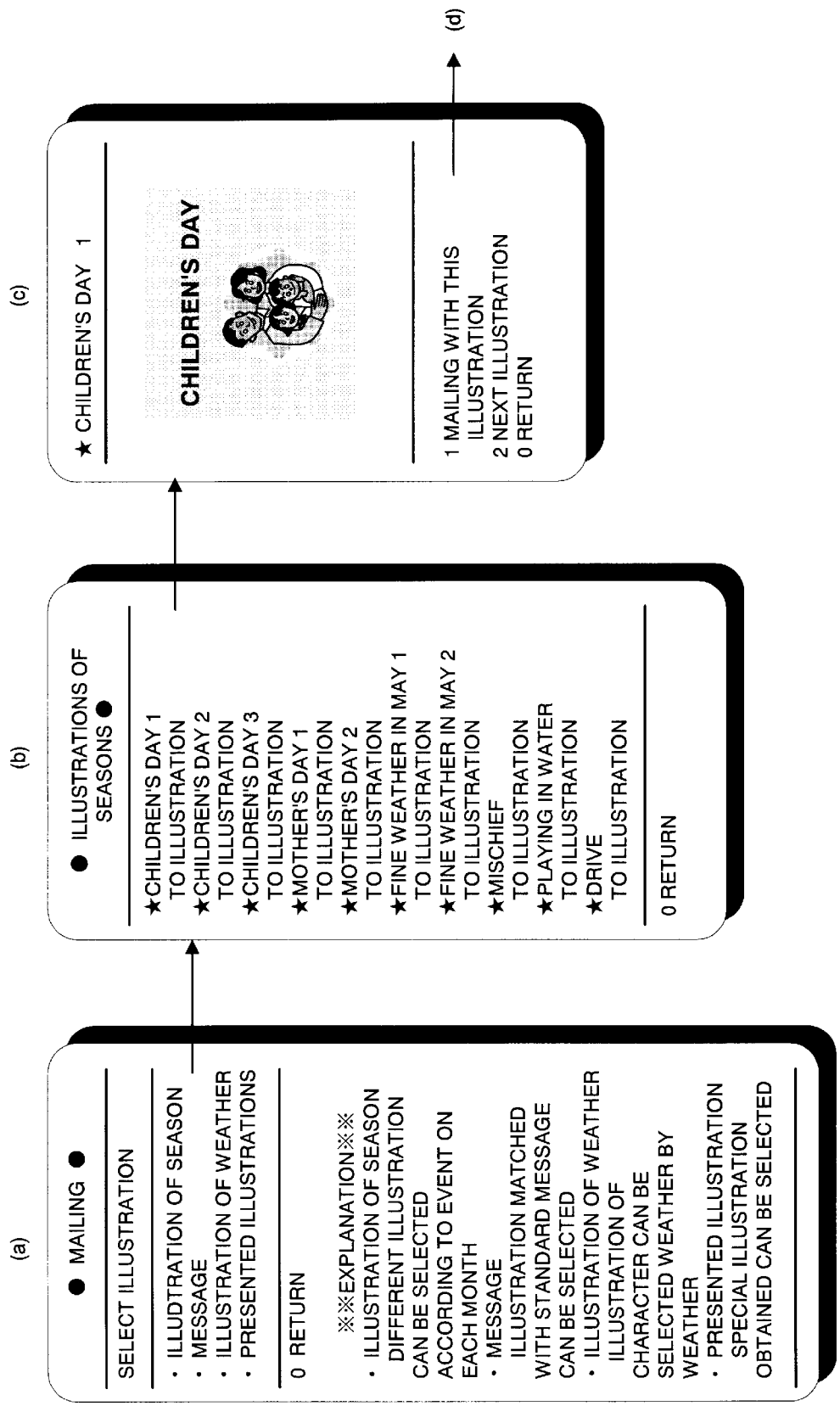
FIG. 9 is a diagram explaining the creation of an HTML mail.
Figure 10:
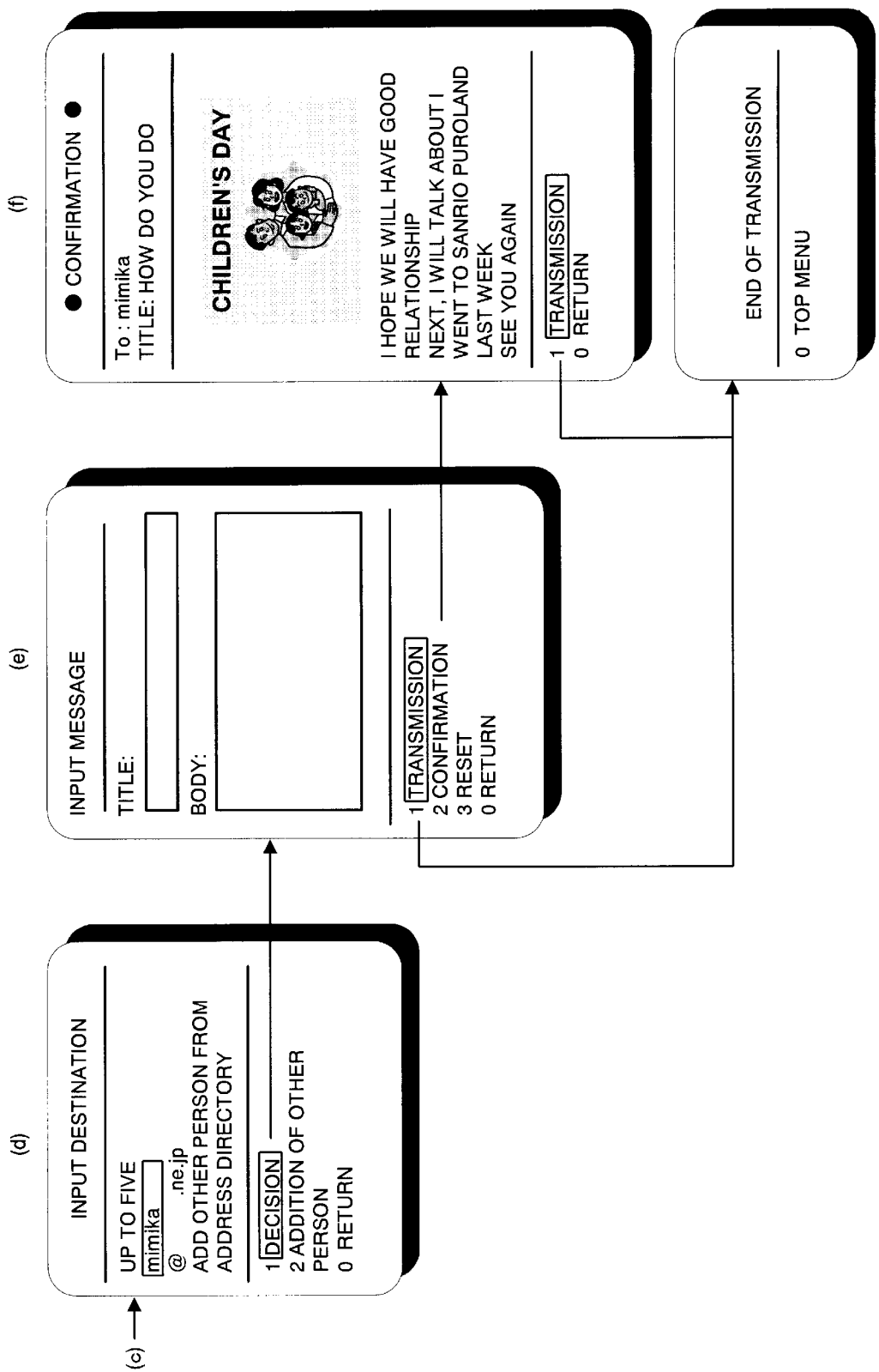
FIG. 10 is a diagram explaining the creation of an HTML mail.

When the HTML mail creator 77 of the mobile phone 4 transmits a request for HTML mail creation, the HTML mail creator 13 of the contents server 1 transmits images, as shown in (*a*) of FIG. 9. While viewing the screen on the mobile phone 4, the operator operates the operation section 78 to select a desired illustration. Each of (b) of FIG. 9 and (c) of FIG. 9 shows a Children's Day 1 selected from illustrations of four seasons. Next, the mail address of the destination of an HTML mail is input on the screen ((d) of FIG. 10). In sequence, the title and the body are input in text form ((e) of FIG. 10). Thus, the creation of the HTML mail is ended ((f) of FIG. 10). The HTML mail creator 13 stores the created HTML mail into the HTML mail memory 14.

Next, the operation of the embodiment with the above-mentioned configuration according to the present invention will be explained below.

First, the operation between creation of an HTML mail and notification of the HTML mail in storage will be explained below.

Figure 11:
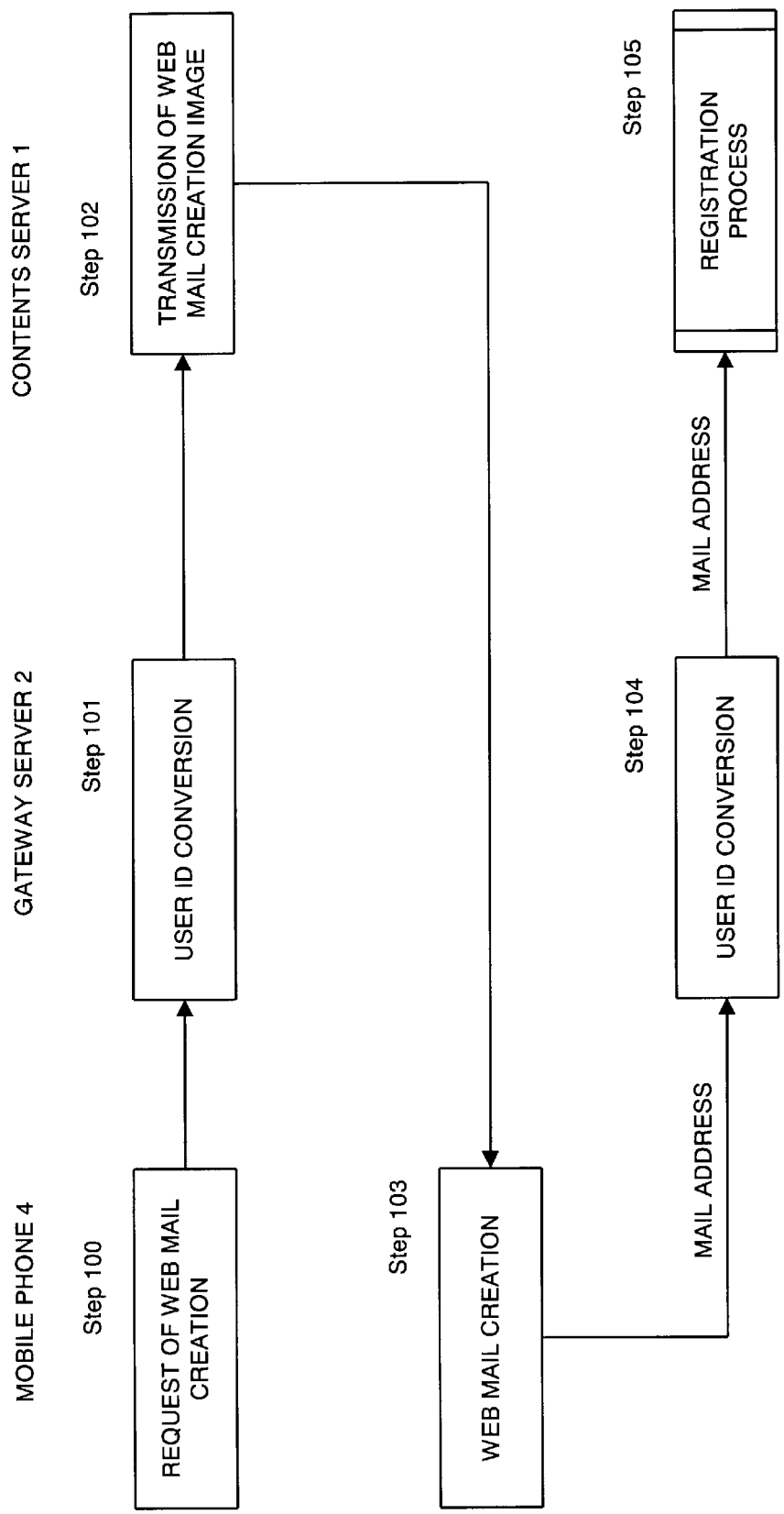
FIG. 11 is an operational flowchart illustrating the operation ranging from the creation of an HTML mail to the updating of a database.

FIG. 11 is a flowchart illustrating the operation ranging from the creation of an HTML mail to the updating of the database.

The user of the mobile phone 4 transmits a request for an HTML mail creation screen to the contents server 1 by the HTML mail creator 76 (step 100).

In response to the request, the gateway 2 retrieves a user identifier corresponding to the intrinsic identifier of the mobile phone 4 from the user identifier list table 70 and converts the intrinsic identifier added to the received request into the retrieved user identifier. Then, the gateway server 2 transmits the converted data to the contents server 1 (step 101).

The contents server 1 responds to the received request. The HTML mail creator 13 sends an HTML mail creation menu screen back to the mobile phone 4 (step 102).

The mobile phone 4 receives the creation menu, creates an HTML mail in accordance with instructions displayed on the screen, and transmits notification of the completion when the creation is ended (step 103). The mail addresses (disclosure destinations) of the destinations of the created HTML mail correspond to "a1@mail.ne.jp", "a12@mail.ne.jp", "a13@mail.ne.jp", "a14@mail.ne.jp", and "a15@mail.ne.jp". That is, five persons are authorized in disclosure.

The gateway server 2 receives a request from the mobile phone 4. Then, in the operation similar to that in the step 102, the gateway server 2 converts the intrinsic identifier into a user identifier and transmits it to the contents server 1 (step 104).

In response to the notification of HTML mail creation, the contents server 1 performs an HTML mail registration process (step 105).

Figures 12, 13:
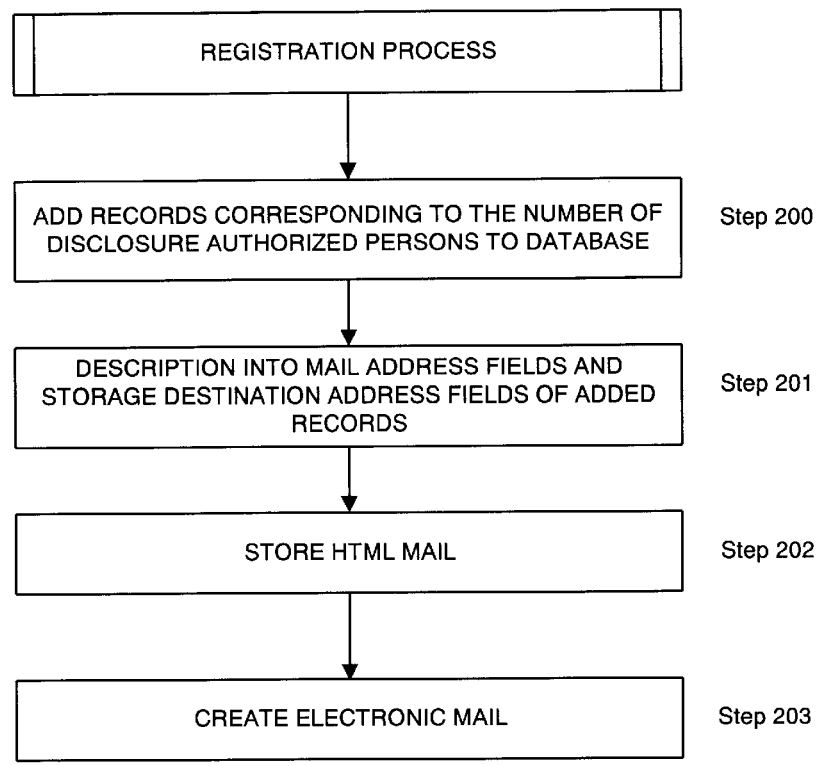
FIG. 12 is a flowchart of a registration process.
FIG. 13 is a diagram illustrating the database 15 updated.

The detail of the registration process will be explanation using the flowchart of FIG. 12.

When receiving the notification of completion of the HTML mail creation, the database updating section 16 updates the database 15. The updating process is carried out by adding the records corresponding to the number of persons authorized in disclosure (step 200), describing destination mail addresses in the mail address fields of the added records, and describing the storage destination addresses of the created HTML mails in the storage fields (step 201).

FIG. 13 shows records 81 to 85 for five persons added to the database 15. In FIG. 13, it is assumed that the storage destination address (identification information) that was stored an HTML mail to be disclosed is "avc¥aaaa" and that the number of persons authorized to view images is five and that the mail addresses of the specific persons authorized in image disclosure are "a1@mail.ne.jp", "a2@mail.ne.jp", "a3@mail.ne.jp", "a4@mail.ne.jp", and "a5@mail.ne.jp", respectively. "avc¥aaaa" is described in each of the records 81 to 85. "a1@mail.ne.jp" is described in the mail address field of the record 81. "a2@mail.ne.jp" is described in the mail address field of the record 82. "a3@mail.ne.jp" is described in the mail address field of the record 83. "a4@mail.ne.jp" is described in the mail address field of the record 84. "a5@mail.ne.jp" is described in the mail address of the record 5.

When the updating process of the database 15 is completed, the HTML mail is stored in the storage destination "avc¥aaaa" (step 202).

In succession, an electronic mail informing of the HTML mail in storage is created (step 203). A link destination including the storage destination "avc¥aaaa" of the HTML mail is set in the electronic mail. When a user, which has received the electronic mail, touches the link button attached to the electronic mail, the user is linked to the storage destination of the HTML mail. The created electronic mail is transmitted to the mail addresses of the destinations (disclosure destinations) of the HTML mail. In this explanation, "a1@mail.ne.jp", "a2@mail.ne.jp", "a3@mail.ne.jp", "a4@mail.ne.jp", and "a5@mail.ne.jp" are respectively listed as the addresses of the transmission destinations of the electronic mails.

In succession, the operation between reception of notification of an HTML mail in storage and reception of an HTML mail will be explained here.

Figure 14:
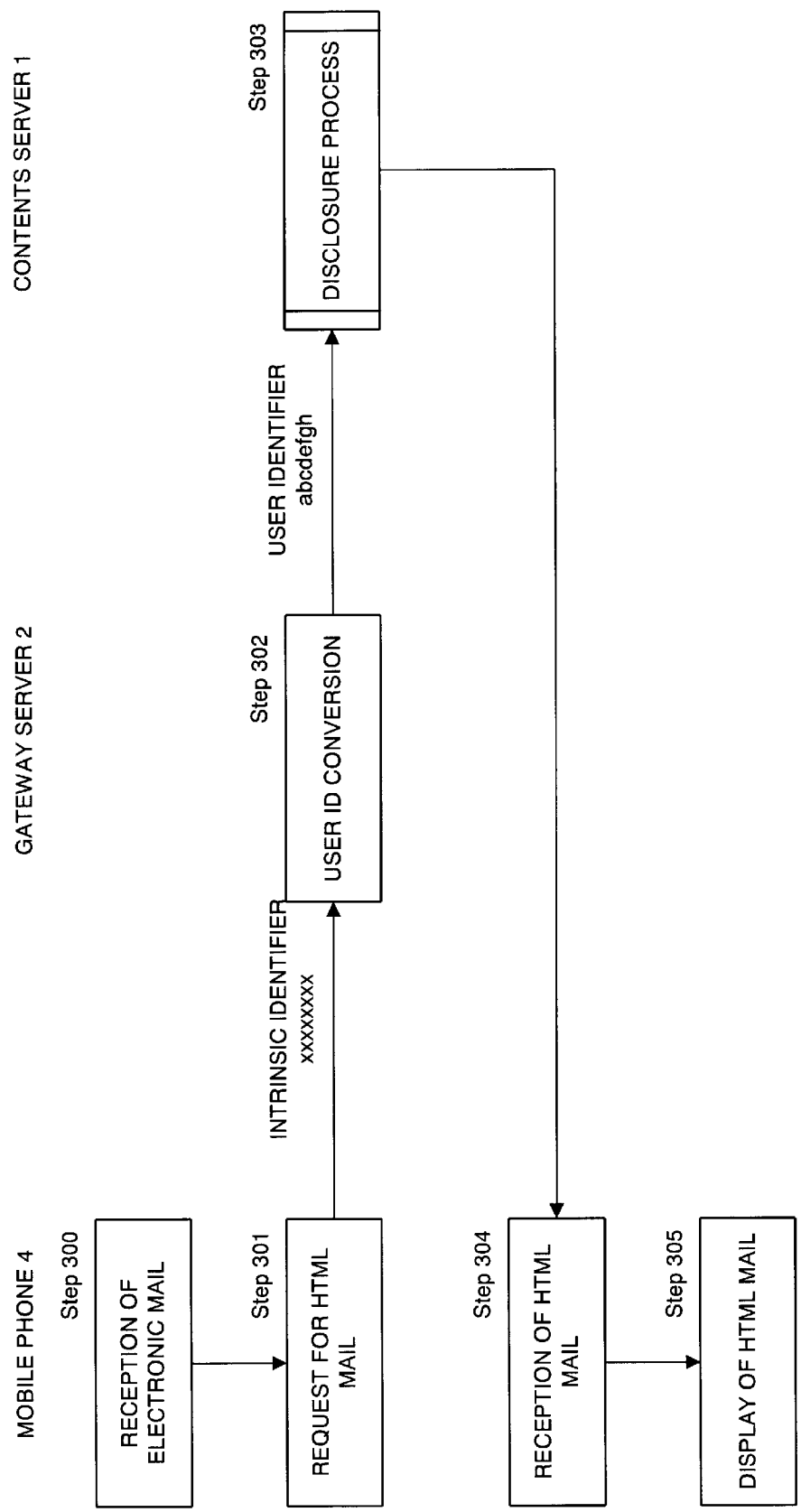
FIG. 14 is a flowchart illustrating the operation ranging from reception of notification of an HTML mail in storage to reception of an HTML mail.

FIG. 14 is a flowchart illustrating the operation between reception of an HTML mail in storage and reception (disclosure) of an HTML mail.

The mobile phone 4 receives an electronic mail notifying of storage of an HTML mail (step 300) and then accesses to the link destination set to the electronic mail (step 301). Meanwhile, the intrinsic identifier of the mobile phone 4 is transmitted. In the present explanation, the intrinsic identifier of the mobile phone 4 is represented as "xxxxxxx".

In response to a request, the gateway server 2 retrieves a user identifier corresponding to the intrinsic identifier of the mobile phone 4 from the user identification list table 60 and converts an intrinsic identifier added to the received request into the retrieved user identifier. Thus, the gateway server 2 transmits the converted user identifier to the contents server 1 (step 302). In this operation, since the intrinsic identifier added to a request from the mobile phone 4 is "xxxxxxx", the user identifier becomes "abcdefgh". "xxxxxxx" is converted into "abcdefgh" when the user identifier corresponding to the intrinsic identifier is retrieved from the user identifier list table 60. The gateway server 2 converts "xxxxxxx" into "abcdefgh" and then transmits it to the contents server 1.

In response to the received request, the contents server 1 implements an HTML mail disclosure process (step 303). The operation of the disclosure process will be explained below in detail using FIG. 15.

The storage destination of an HTML mail is set as an identifier in accordance with the received request (step 400). Here, the HTML mail storage Destination is "avc¥aaaa". The record describing the storage destination is retrieved from the database 15 (step 401). In the concrete explanation with FIG. 13, there are the records 81 to 85 each of which "avc¥aaaa" is described in the storage destination field.

Next, of the retrieved records 81 to 85, records, in which a user identifier is described in a user identifier field, are retrieved (steps 402 and 403).

As shown in FIG. 13, if there are no records each in which a user identifier is described in the user identifier field, the user identifier of the mobile phone 4 is described in a given record (step 404). Thus, the HTML mail is read out from the storage destination address and is transmitted it to the mobile phone 4 (step 405). Moreover, when a user identifier is described, it is not necessary to match the mail address with the user identifier. The user identifier may be described in any one of unoccupied records. However, if the mail address of the mobile phone in a disclosure requiring state becomes available, the user identifier may be described in the record describing the acquired mail address.

Figure 15:
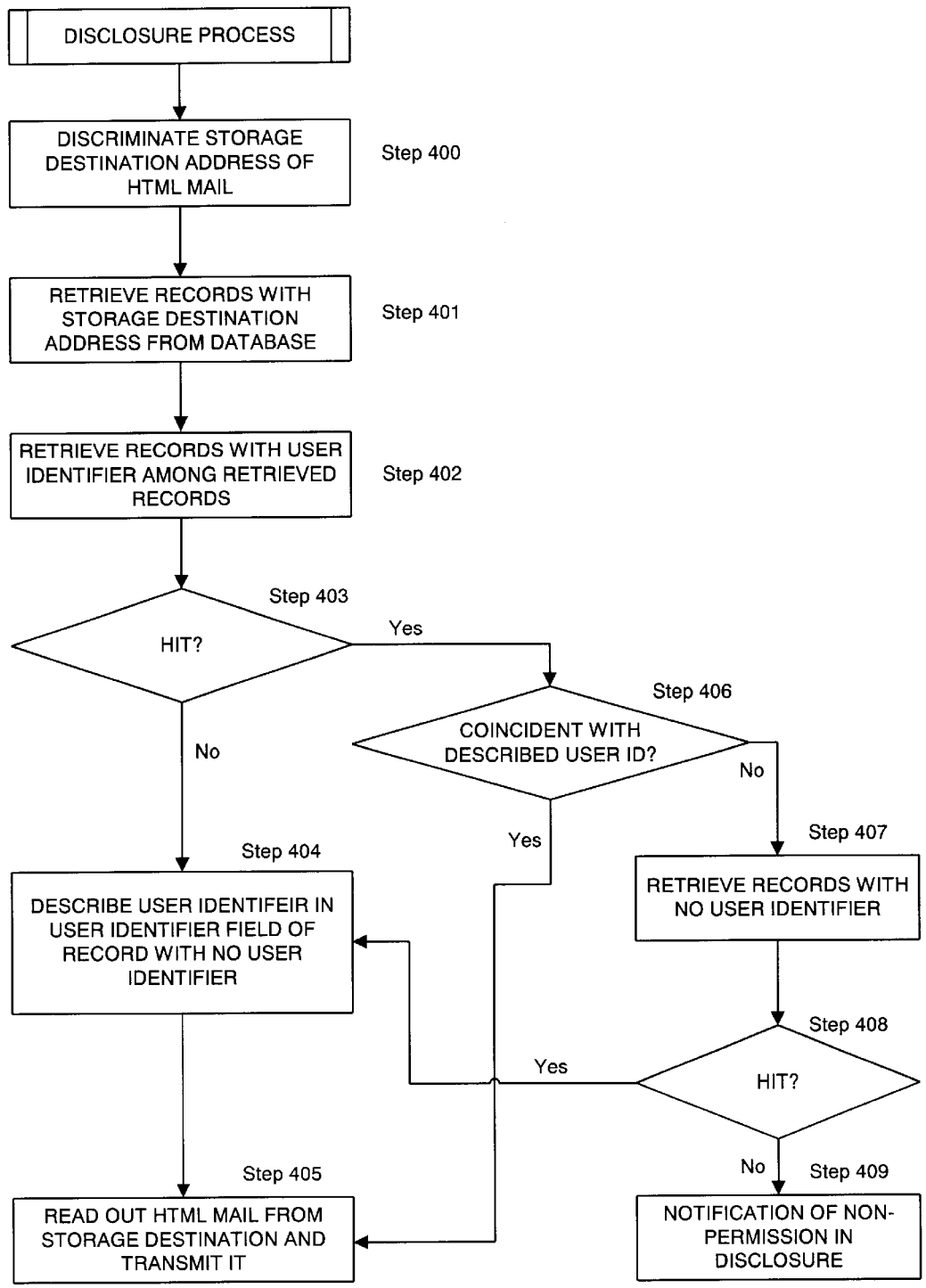
FIG. 15 is a flowchart illustrating the operation of a distribution process.

If there is a record in which a user identifier is described in the user identifier field, among retrieved records 81 to 85, (step 402 and 403), the user identifier described in the record is verified against the user identifier of the disclosure requesting mobile phone 4 (step 406). If the verification shows that the same user identifier as the user identifier of the disclosure requesting mobile phone 4 is described in the user identifier field, this means that the same person has made a disclosure request for the second time or later. In this case, the HTML mail is read out of the storage destination and then is transmitted to the mobile phone 4 (step 405). For example, the user identifiers are respectively described in the user identifiers of the records 81 and 82 among the retrieved records 81 to 85, as shown in FIG. 15. If the user identifier "abcdefgh" described in the user identifier field of the record 81 coincides with the user identifier of the disclosure requesting portable 4, the contents server 1 judges that the mobile phone 4 with the user identifier "abcdefgh" has made a request for the second time or later. Thus, the contents server 1 discloses the HTML mail.

As a result of the verification, when the user identifier differs from the user identifier of the disclosure requesting mobile phone 4 (step 406), the contents server 1 retrieves the presence of records with no user identifiers (step 407).

If there is a record with no user identifier, the contents serve 1 describes the user identifier of the disclosure requesting mobile phone 4 in the record (step 404), reads out the HTML mail from the storage destination and then transmits it to the mobile phone 4 (step 405). For example, let us assume that the user identifier of a disclosure requesting mobile phone 4 is "xyzzzzzz" and that user identifiers are described in the user identifier fields of the records 81 and 82 among records 81 to 85 retrieved as shown in FIG. 16 and that the user identifier "xyzzzzzz" of the mobile phone 4 does not coincide with the user identifiers described in the user identifier fields of the records 81 and 82. In such a condition, if there is a record with no user identifier, the contents server 1 judges that the number of persons which wants image disclosure does not still reach the number of persons authorized in disclosure. In order to allow the disclosure, the contents server 1 describes the user identifier in the record of which the user identifier field is unoccupied.

When a verification result indicates that the user identifier differs from the user identifier of the disclosure requesting mobile phone 4 and that there is not a record with a user identifier (step 407 and 408), the contents server 1 determines that disclosure is not allowed (step 409). For example, let us consider that user identifiers are respectively described in all user identifier fields of the records 81 to 85 retrieved as shown in FIG. 17 and that the user identifier, "xyzzzzzz", of disclosure requesting mobile phones 4 does not coincide with any one of the above-mentioned user identifiers. In such a condition, the contents server 1 judges that the mobile phones 4 with the user identifier "xyzzzzzz" made a dishonest disclosure request, so that the image disclosure is rejected.

In the above-mentioned manner, the contents server 1 determines whether or not the HTML mail is disclosed. The HTML mail allowed in disclosure is transmitted to destinations (disclosure destinations).

Returning back to FIG. 12, the mobile phone 4 receives the HTML mail (step 304) and displays it on the screen (step 305).

In the above-mentioned operation, even if the HTML mail contains copyrighted illustrations, persons other than persons authorized in disclosure are not allowed in disclosure so that the copyright can be prevented from infringement.

In the first embodiment, the HTML is used as a program language. However, it should be noted that the program language is not limited only to the HTML. For example, a program language described in a XML (Extensible Markup Language), or a hope of the next generation is language, may be used. A sole person may be authorized in disclosure, instead of plural persons.

In the first embodiment, the storage destination information has been used as identification information about the created HTML mail (image). However, other type of information may be used.

The second embodiment will be described here.

The second embodiment is characterized in that the mail addresses of members acquired in registration of service members and the user identifiers of the member's mobile phones are previously described in the database 15. That is, records for members are held in the database 15 in member's registration. Member's mail addresses are previously described in the mail address fields of records for the members. The user identifiers of the member's mobile phones are previously described in the user identifier fields. When a destination (disclosure destination) corresponds to the mail address of a member, the database updating section 16 updates only the storage destination field.

When a disclosure destination belongs to a member, a person other than the authorized members may request disclosure (downloading) of an HTML mail for the first time. However, because the user identifier already is in a described state, the above-mentioned configuration can prevent a person other than the authorized members from requesting (downloading) the disclosure.

The third embodiment will be described here.

Now, various type mobile phones are commercially available and have various screen sizes and various image data capacities. If image data of one type is prepared, mobile phones of some types may not display delivered image data correctly or totally. In the third embodiment, image data compatible for the types of mobile phones are prepared to the same illustrations. The third embodiment is characterized in that the function of distributing image data (illustrations) compatible for types of mobile phones is added to the first embodiment, upon creation of an HTML mail.

In current various services, a mobile phone transmits a request, together with information about its type. In the third embodiment, the contents server 1 judges the type information and selects and distributes image data according to the type. In this configuration, the image database 12 holds as image data folders organized by type. Image data corresponding to each type is stored to the corresponding folder. The HTML mail creator 13 reads out image data corresponding to a suitable type from the image database 12, based on the type information and then distributes it to mobile phones 4.

The above-mentioned embodiments may be appropriately combined with each other. For example, the configurations of the second and third embodiments may be combined with the configuration of the first embodiment.

According to the present invention, since records corresponding to third number of persons authorized in disclosure of one image are provided and managed in the database, it can be prevented that images are disclosed greater than the number of records, that is, to persons other than persons authorized in disclosure. Therefore, the present invention has the advantage of preventing images having copyrighted illustrations from being infringed in copyright.

What is claimed is:

1. An image disclosure system wherein an image displayed in a predetermined programming language by a user is disclosed to a specific person, comprising:
    a mobile communication network;
    a plurality of mobile phones connected to said mobile communication network;
    a gateway server connected to said plurality of mobile phones via said mobile communication network;
    a network; and
    a contents server connected to said gateway server via said network;
    said plurality of mobile phones each including:
        a display for displaying images;
        means for transmitting an image disclosure to said contents server, said image disclosure request to which identification information on a disclosure requested image is added, and then downloading said image; and
        an image controller for displaying said downloaded image to said display;
    said gateway server including:
        a user identifier table in which an intrinsic identifier and a user identifier paired with said intrinsic identifier is described in a one-to-one correspondence; and
        means for receiving an image disclosure request from a mobile phone, retrieving a user identifier corresponding to the intrinsic identifier of said mobile phone from said user identifier table; converting said intrinsic identifier of said mobile phone into a retrieved user identifier, and transmitting the image disclosure request from said mobile phone to said contents server;
    said contents server including:
        a memory for storing an image to be disclosed;
        a database including records each being formed of an identification information field in which identification information for identifying an image to be disclosed is described and a user identifier field in which a user identifier is described;
        means for creating identification information on an image to be disclosed;
        data base updating means for adding records corresponding to the number of persons authorized in disclosure to said database and describing image identification information to the identification information field of each of said added records;
        retrieving means for, when a mobile phone sends an image disclosure request, retrieving a record which has an identification information field in which image identification information added to a disclosure request is described; and
        a disclosure controller for, when the user identifier of said disclosure requesting mobile phone coincides with a user identifier described on the identifier field of any one of said retrieved records, reading out a disclosure requested image out of said memory and then transmitting it to said mobile phone;
        said disclosure controller for, when the user identifier of the disclosure requesting mobile phone does not coincide with user identifiers described on the identifier fields of said retrieved records and when there is a record of which a user identifier is not described on an identifier field, among said retrieved records, describing the user identifier of said disclosure requesting mobile phone in the identifier field of any one of records in which no user identifier is described and then reading out a disclosure requested image from said memory and then transmitting it to said mobile phone;
        said disclosure controller for, when the user identifier of said disclosure requesting mobile phone does not coincide with the user identifiers described in the identifier fields of said retrieved records and when an user identifier is described in all the identifiers of said retrieved records, inhibiting image disclosure, without transmitting a disclosure requested image.

2. The image disclosure system defined in claim 1, wherein said contents server comprises:
    means for acquiring information on a specific person authorized in image disclosure from a mobile phone of a disclosure requesting person; and
    means for transmitting identification information on an image to be disclosed to a mobile phone of said specific person, based on said information on said specific person acquired.

3. The image disclosure system defined in claim 1, wherein a member record in which the user identifier of a mobile phone of a service member is described in a user identifier field is previously stored in said database; and said system further comprising database updating means for, when a specific person authorized in image disclosure is a service member, describing identification information on an image to be disclosed in the identification information field of a member record of said service member.

4. The image disclosure system defined in claim 1, wherein information on a storage destination storing an image is used as image identification information.

5. An image disclosure system wherein an image displayed in a predetermined programming language by a user is disclosed to a specific person, comprising:
    a mobile communication network;
    a plurality of mobile phones connected to said mobile communication network;
    a gateway server connected to said plurality of mobile phones via said mobile communication network;
    a network;
    a contents server connected to said gateway server via said network; and
    a mail server for transmitting an electronic mail to said mobile phone;
    said plurality of mobile phones each including:
        a display for displaying images;
        an electronic mail receiver for receiving an electronic mail to which image identification information is added;
        means for transmitting an image disclosure request to said contents server, said image disclosure request to which said image identification information is added, and then downloading an image; and an image controller for displaying said downloaded image to said display;

said gateway server including:

a user identifier table in which an intrinsic identifier of a mobile phone and a user identifier paired with said intrinsic identifier are described in a one-to-one correspondence; and means for receiving an image disclosure request from a mobile phone, retrieving a user identifier corresponding to the intrinsic identifier of said mobile phone from said user identifier table, converting said intrinsic identifier of said mobile phone into a retrieved user identifier, and transmitting the image disclosure request from said mobile phone to said contents server;

said contents server including:

a memory for storing an image to be disclosed;

a database including records each being formed of an identification information field in which identification information for identifying an image to be disclosed is described and a user identifier field in which a user identifier is described;

means for creating identification information on an image to be disclosed;

means for transmitting an electronic mail to which identification information on said created image is added, to a specific person authorized in image disclosure;

data base updating means for adding records corresponding to the number of persons authorized in image disclosure to said database and describing the identification information of said image to the identification information field of each of said records added, retrieving means for, when a mobile phone sends an image disclosure request, retrieving a record in which image identification information added to a disclosure request is described in the identification information field; and a disclosure controller for, when the user identifier of the disclosure requiring mobile phone coincides with a user identifier described on the identifier field of any one of said retrieved records, reading out an image specified with said image identification information from said memory and then transmitting it to said mobile phone;

said disclosure controller for, when the user identifier of the disclosure requiring mobile phone does not coincide with a user identifier described on the identifier fields of said retrieved records and when there are records in which user identifiers are not described in an identifier field, among said retrieved records, describing the user identifier of said disclosure requesting mobile phone in the identifier field of any one of records in which user identifiers are not described and then reading out an image specified with said image identification information from said memory and then transmitting it to said mobile phone;

said disclosure controller for, when the user identifier of said disclosure requesting mobile phone does not coincide with user identifiers described in the identifier fields of said retrieved records and when the user identifier is described in all the identifiers of said retrieved records, inhibiting image disclosure, without transmitting a disclosure requested image.

6. The image disclosure system defined in claim 5, wherein each of said mobile phones comprises means for creating an image to be disclosed and means for transmitting said created image and information on specific persons authorized in disclosure of said created image, to said contents server; and wherein said contents server comprises means for receiving said created image and storing it into said memory and means for notifying said database updating means of the number of persons authorized in disclosure based, on information on said specific person.

7. The image disclosure system defined in claim 5, wherein said database stores a member record in which the user identifier of a mobile phone of a service member is described in a user identifier field; and said database updating means, when a specific person authorized in image disclosure is a service member, describes identification information on an image to be disclosed in the identification information field of the member record of said service member.

8. The image disclosure system defined in claim 5, wherein information on a storage destination storing an image is used as image identification information.

9. The image disclosure system defined in claim 5, wherein said contents server comprises an image data memory for storing image data used to create an image to be disclosed and means for reading out a desired image data from said image data memory, in response to an image creation request from a mobile phone and then transmitting it to said mobile phone; and wherein each of said mobile phones comprises means for requesting image data to the contents server, acquiring image data, creating an image to be disclosed, with said acquired image data, and transmitting said created image and a mail address of a specific person being an image disclosures, destination, to said contents server.

10. The image disclosure system defined in claim 9, wherein said gateway server comprises a type information table in which an intrinsic identifier of a mobile phone and type information of said mobile phone are described in a one-to-one correspondence and means for retrieving the type information of said mobile phone from said type information table, in response to a request from said mobile phone, based on an intrinsic identifier added to said request, adding said type information to said request, and then transmitting the added information; and wherein said contents server comprises image data memory for storing image data used for image creation for every type of mobile phones and means for reading out image data corresponding to the type information added to said request from said image data memory and then transmitting it to said mobile phone.

11. An contents server in an image disclosure system, said contents server disclosing an image displayed in a predetermined programming language by a user, to a specific person, said image disclose system including a mobile communication network, a plurality of mobile phones connected to said mobile communication network, a gateway server connected to said plurality of mobile phones via said mobile communication network, a network, and a contents server connected to said gateway server via said network; said gateway server, when said mobile phone transmits a request to said contents server, converting an intrinsic identifier of a mobile phone added to said request into a user identifier corresponding to said intrinsic identifier and then transmitting said request to said contents server; said contents server comprises:

a memory for storing said image to be disclosed;

a database including records each being formed of an identification information field in which identification information for identifying an image to be disclosed is described and a user identifier field in which a user identifier is described;

means for creating identification information on an image to be disclosed;

data base updating means for adding records corresponding to the number of persons authorized in image disclosure to said database and describing the image identification information in the identification information field of each of said records added;

retrieving means for retrieving records in which identification information on an image added to a disclosure request is described in an identification information field, in response to an image disclosure request from a mobile phone; and a disclosure controller for, when the user identifier of the disclosure requesting mobile phone coincides with a user identifier described in the identifier field of any one of said retrieved records, reading out a disclosure requested image from said memory and then transmitting it to said mobile phone;

said disclosure controller for, when the user identifier of the disclosure requesting mobile does not coincide with a user identifier described in the identifier fields of said retrieved records and when there are records in which a user identifier is not described in an identifier field, among said retrieved records, describing the user identifier of said disclosure requesting mobile phone in the identifier field of any one of records in which user identifiers are not described;

said disclosure controller for reading out a disclosure requested image from said memory, transmitting it to said mobile phone, and then, when the user identifier of said disclosure requesting mobile phone does not coincide with the user identifiers described in the identifier fields of said retrieved records and when a user identifier is described in all the identifier fields of all of said retrieved records, inhibiting image disclosure, without transmitting a disclosure requested image.

12. The contents server defined in claim 11, further comprising means for acquiring an image to be disclosed and information on the number of persons authorized in image disclosure, from a mobile phone of a disclosure requesting person.

13. The contents server defined in claim 11, further comprising means for acquiring information on a person authorized in image disclosure from a mobile phone of a disclosure requiring person and means for transmitting the identification information on an image to be disclosed to the mobile phone of said specific person, based on information on said acquired specific person.

14. The contents server defined in claim 11, wherein said database stores a member record in which a user identifier of a mobile phone of a service member is described in a user identifier field; and further comprising database updating means for, when a specific person authorized in image disclosure is a service member, describing identification information on an image to be disclosed in the identification information field of a member record of said service member.

15. The image disclosure system defined in claim 11, wherein information on a storage destination storing an image is used as image identification information.

16. An image disclosure method, wherein an image displayed in a predetermined programming language by a user is disclosed to a specific person in an network system; said network system including a mobile communication network; a plurality of mobile phones connected to said mobile communication network; a gateway server connected to said plurality of mobile phones via said mobile communication network; a network; a contents server connected to said gateway server via said network, and a mail server for transmitting an electronic mail to said mobile phones; said image disclosure method comprising the steps of:

creating image identification information for identifying an image to be disclosed, by means of said contents server;

adding, by means of said contents server, records corresponding to the number of persons authorized in image disclosure to a database and then describing said image identification information in the identification information field of each of said added records, said data base including records each being formed of an identification information field in which said image identification information is described and a user identification field in which a user identifier is described;

transmitting an image disclosure request to which image identification information on a disclosure required image is added, to said contents server by means of said mobile phone;

converting, by means of said gateway server, the intrinsic identifier of said mobile phone added to an image disclosure request and then transmitting said image disclosure request to said contents server;

receiving, by means of said contents server, an image disclosure request from said mobile phone and then retrieving a record in which image identification information added to said disclosure request is described in an identification information field;

transmitting, when the user identifier of the disclosure requesting mobile phone coincides with a user identifier described in the identifier field of any one of said retrieved records, a disclosure required image to said mobile phones by means of said contents server;

describing, when the user identifier of the disclosure requesting mobile phone does not coincide with a user identifier described in the identifier fields of said retrieved records and when there are records in which a user identifier is not described in an identifier field, among said retrieved records, the user identifier of said disclosure requesting mobile phone in the identifier field of any one of records in which user identifiers are not described and then transmitting a disclosure required image to said mobile phone; and inhibiting, when the user identifier of said disclosure requesting mobile phone does not coincide with the user identifier described in the identifier fields of said retrieved records and when an user identifier is described on the identifiers of all of said retrieved records, image disclosure by means of said contents server, without transmitting a disclosure requested image.

17. The image disclosure method defined in claim 16, further comprising the step of acquiring an image to be disclosed and information on the number of persons authorized in image disclosure from a mobile phone of a disclosure requesting person.

18. The image disclosure method defined in claim 16, further comprising the steps of:

acquiring information on a specific person authorized in image disclosure from a personal phone of a disclosure requesting person; and transmitting image identification information on an image to be disclosed to a mobile phone of said specific person, based on said information on said acquired specific person.

19. The image disclosure method defined in claim 16, further comprising the steps of:
    information on a storage destination storing an image to be disclosed is used as image identification information.

20. The image disclosure method defined in claim 16, further comprising the steps of:
    previously storing to said database a member record in which the user identifier of a mobile phone of a service member is described in a user identifier field; and
    describing, when a specific person authorized in image disclosure is a service member, image identification information on an image to be disclosed in the identification information field of said member record, without newly adding a record.

21. An image disclosure system wherein an image displayed in a predetermined programming language by a user is disclosed to a specific person, comprising:
    a mobile communication network;
    a plurality of mobile phones connected to said mobile communication network;
    a gateway server connected to said plurality of mobile phones via said mobile communication network;
    a network; and
    a contents server connected to said gateway server via said network;
    said plurality of mobile phones each including:
        a display for displaying images;
        a processor is configured to transmit an image disclosure to said contents server, said image disclosure request to which identification information on a disclosure requested image is added, and then downloading said image; and to display said downloaded image to said display;
    said gateway server including:
        a user identifier table in which an intrinsic identifier and a user identifier paired with said intrinsic identifier is described in a one-to-one correspondence; and
        a processor is configured to receive an image disclosure request from a mobile phone, retrieving a user identifier corresponding to the intrinsic identifier of said mobile phone from said user identifier table; convert said intrinsic identifier of said mobile phone into a retrieved user identifier, and transmit the image disclosure request from said mobile phone to said contents server;
    said contents server including:
        a memory for storing an image to be disclosed;
        a database including records each being formed of an identification information field in which identification information for identifying an image to be disclosed is described and a user identifier field in which a user identifier is described;
        a processor is configured to
            create identification information on an image to be disclosed;
            add records corresponding to the number of persons authorized in disclosure to said database and describe image identification information to the identification information field of each of said added records; retrieve a record which has an identification information field in which image identification information added to a disclosure request is described when a mobile phone sends an image disclosure request;
            when the user identifier of said disclosure requesting mobile phone coincides with a user identifier described on the identifier field of any one of said retrieved records, read out a disclosure requested image out of said memory and then transmitting it to said mobile phone;
            when the user identifier of the disclosure requesting mobile phone does not coincide with user identifiers described on the identifier fields of said retrieved records and when there is a record of which a user identifier is not described on an identifier field, among said retrieved records, describe the user identifier of said disclosure requesting mobile phone in the identifier field of any one of records in which no user identifier is described and then reading out a disclosure requested image from said memory and then transmitting it to said mobile phone;
            when the user identifier of said disclosure requesting mobile phone does not coincide with the user identifiers described in the identifier fields of said retrieved records and when an user identifier is described in all the identifiers of said retrieved records, reject image disclosure.

22. The image disclosure system defined in claim 21, wherein said processor of said contents server is further configured to:
    acquire information on a specific person authorized in image disclosure from a mobile phone of a disclosure requesting person; and
    transmit identification information on an image to be disclosed to a mobile phone of said specific person, based on said information on said specific person acquired.

23. The image disclosure system defined in claim 21, wherein a member record in which the user identifier of a mobile phone of a service member is described in a user identifier field is previously stored in said database; and
    said processor of said contents server is further configured to, when a specific person authorized in image disclosure is a service member, describe identification information on an image to be disclosed in the identification information field of a member record of said service member.

24. The image disclosure system defined in claim 21, wherein information on a storage destination storing an image is used as image identification information.

25. An contents server in an image disclosure system, said contents server disclosing an image displayed in a predetermined programming language by a user, to a specific person, said image disclose system including a mobile communication network, a plurality of mobile phones connected to said mobile communication network, a gateway server connected to said plurality of mobile phones via said mobile communication network, a network, and a contents server connected to said gateway server via said network; said gateway server, when said mobile phone transmits a request to said contents server, converting an intrinsic identifier of a mobile phone added to said request into a user identifier corresponding to said intrinsic identifier and then transmitting said request to said contents server; said contents server comprises:
    a memory for storing said image to be disclosed;
    a database including records each being formed of an identification information field in which identification information for identifying an image to be disclosed is described and a user identifier field in which a user identifier is described;

a processor is configured to;
  create identification information on an image to be disclosed,
  add records corresponding to the number of persons authorized in image disclosure to said database and describing the image identification information in the identification information field of each of said records added,
  retrieve records in which identification information on an image added to a disclosure request is described in an identification information field, in response to an image disclosure request from a mobile phone,
  when the user identifier of the disclosure requesting mobile phone coincides with a user identifier described in the identifier field of any one of said retrieved records, read out a disclosure requested image from said memory and then transmitting it to said mobile phone, when the user identifier of the disclosure requesting mobile does not coincide with a user identifier described in the identifier fields of said retrieved records and when there are records in which a user identifier is not described in an identifier field, among said retrieved records, describe the user identifier of said disclosure requesting mobile phone in the identifier field of any one of records in which user identifiers are not described, and
  read out a disclosure requested image from said memory, transmitting it to said mobile phone, and then, when the user identifier of said disclosure requesting mobile phone does not coincide with the user identifiers described in the identifier fields of said retrieved records and when a user identifier is described in all the identifier fields of all of said retrieved records, inhibiting image disclosure, without transmitting a disclosure requested image.

26. The contents server defined in claim 25, wherein said processor of said contents server is further configured to acquire an image to be disclosed and information on the number of persons authorized in image disclosure, from a mobile phone of a disclosure requesting person.

27. The contents server defined in claim 25, wherein said processor of said contents server is further configured to acquire information on a person authorized in image disclosure from a mobile phone of a disclosure requiring person and means for transmitting the identification information on an image to be disclosed to the mobile phone of said specific person, based on information on said acquired specific person.

28. The contents server defined in claim 26, wherein said database stores a member record in which a user identifier of a mobile phone of a service member is described in a user identifier field; and said processor of said contents server is further configured to, when a specific person authorized in image disclosure is a service member, describe identification information on an image to be disclosed in the identification information field of a member record of said service member.

29. The image disclosure system defined in claim 26, wherein information on a storage destination storing an image is used as image identification information.

* * * * *